July 4, 1944.   J. J. OSPLACK   2,352,911
BEARING
Filed July 17, 1942
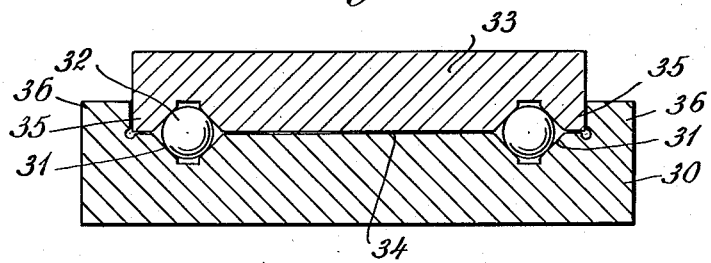
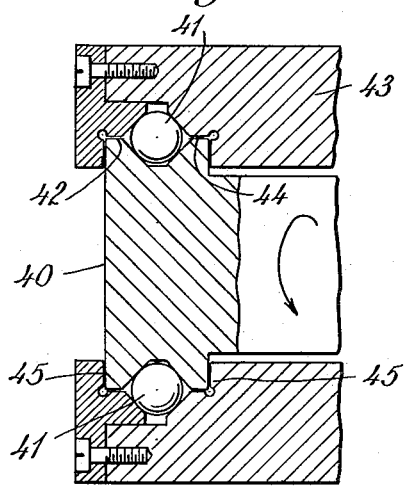
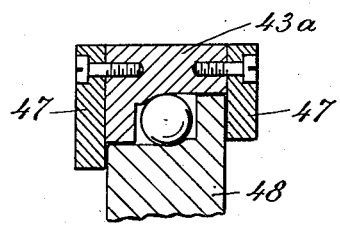
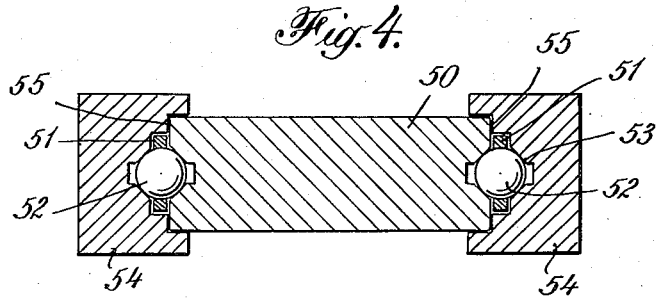
INVENTOR
Joseph J. Osplack
BY
Pennie Davis Marvin & Edmonds
his ATTORNEYS Patented July 4, 1944

2,352,911

UNITED STATES PATENT OFFICE 2,352,911

BEARING

Joseph J. Osplack, Detroit, Mich., assignor to Vinco Corporation, Detroit, Mich., a corporation of Michigan Application July 17, 1942, Serial No. 451,301

4 Claims. (Cl. 308—35)

This invention relates to improvements in bearings, particularly to bearing for precision machines where it is essential that their rotating parts be maintained accurately in position without play.

In machines of this kind it is customary to support the movable parts in ball- or roller-bearings which are accurately ground and fitted and of ample size to carry the intended load without deformation, and such bearings will perform satisfactorily so long as the machine is not overloaded or subjected to shock.

In the manufacture of various machines and apparatus such, for example, as airplane engines, there are a number of gears and other parts which have to be made with extreme accuracy as, for example, with tolerances of ±.0002 in. These parts have to be gauged with inspection machines and configuration checkers wherein there are rotating parts whose position must be maintained with great accuracy. It has been observed that such machines will frequently develop inaccuracies after a period of use insufficient to produce any significant wear of the bearings. I have discovered that one of the frequent causes of this inaccuracy is a momentary overload or shock which is not sufficient to produce any discernible damage to the machine but which has nevertheless permanently deformed the bearing surface which is momentarily overloaded or which sustains the shock sufficiently to impair the accuracy of the machine.

In precision tools for which the bearings of this application were primarily designed, overload in the sense of work deliberately applied to the bearing but which is excessive in amount, is unusual, for the reason that precision tools are customarily made with large factors of safety. That is to say, in the interest of precision the parts are made of a size such that the stresses to which they are subjected under intended loads will be but a fraction of the maximum load that may be applied without exceeding the elastic limit of the metal. The type of overload against which such bearing need be protected is the overload that comes from accident such, for example, as dropping a heavy piece on the work while the tool is in operation. Such overload may of course be applied to the bearing in any direction, and my improved bearings are particularly designed to prevent injury to the bearings under such accidental overloads.

In the accompanying drawings I have illustrated my improvements as incorporated in several different types of bearings, and in the said drawing:

Fig. 1 is a sectional view of a bearing for a horizontal slide wherein the bearing is protected against pitting from both vertical and horizontal shock;

Fig. 2 is a sectional view of an annular bearing wherein the bearing is protected against shock both radially and axially;

Fig. 3 is a similar view of a modified type of annular bearing wherein protection is afforded both axially and radially of the bearing; and Fig. 4 is a sectional view of a slide supported by ball bearings which are protected against shock in four directions.

My invention may be applied to bearings for reciprocating slides and also to annular bearings for rotating parts. In Fig. 1 I have illustrated a conventional type of ball bearing for a load-supporting horizontal slide. In the drawing 30 represents the supporting member having two longitudinal races 31 for the supporting balls 32. The slide 33 rests on the balls 32 and between the two rows of balls the metal of the slide 33 is finished to provide a bearing surface 34 which is spaced from a similar bearing surface on the part 30 by a clearance sufficient for the two surfaces to be out of contact under normal load but close enough together to be brought into contact by an abnormal load or by a blow against the load-carrying surface, before the bearing balls and the bearing surfaces of the ball races are compressed beyond their elastic limit.

The bearing shown in Fig. 1 is also protected against shock in a horizontal direction. To this end the metal of the slide 33 is extended beyond the ball races to an extent to provide downwardly projecting ridges 35 at the outside of each row of balls.

The outer vertical faces of the slide 33 are finished to provide parallel vertical bearing surfaces and co-operating with these bearing surfaces are upstanding ridges 36 along the outer margins of the part 30 the inner vertical faces of which are finished to provide co-operating bearing surfaces spaced from the outer vertical faces of the slide 33 by a distance sufficient to permit free movement of the slide under normal conditions but close enough together to come into engagement when the slide 33 is subjected to an abnormal lateral thrust sufficient to exceed the normal elastic limit of the balls and engaging ball races.

In Fig. 2 I have shown a modified form of annular bearing wherein the bearing is protected not only against overload in a direction radial of the axis of rotation, but also in a direction longitudinally of the axis of rotation. To this end the annular faces on the inner member 40 of the bearing at each side of the bearing balls 41 are finished to provide plain bearing surfaces 42 at each side of the bearing balls. The outer member 43 of the bearing is similarly provided with bearing surfaces 44 on each side of the ball race and the clearance between these surfaces 42 and 44 is such that they are normally out of contact but will be brought into engagement under abnormal load sufficient to otherwise exceed the elastic limit of the bearing balls and their races.

To protect the bearing against overload in an axial direction the metal of the outer member 43 of the bearing projects radially inward on each side of the bearing flange of the inner member 40 as illustrated at 45 (Fig. 2) to provide a plain thrust bearing on either side of the ball race of the inner member 40, the clearance between the faces being sufficient for them normally to be out of engagement but to be brought into engagement by excessive axial load or shock in either direction.

In Fig. 3 I have illustrated my improvement applied to a different form of rotary bearing to give protection against axial thrust in either direction.

In Fig. 3 the outer bearing member 43a is provided on each side with attached rings 47 whose outer diameter is equal to that of the member 43 but which are wide enough to project inwardly on each side of the inner member 48 of the bearing. The adjacent faces of the rings 47 and member 48, respectively, are finished to provide plain bearing surfaces properly spaced to come into engagement when the bearing is subjected to abnormal axial load or shock.

In Fig. 4 I have illustrated my improved bearing applied to a reciprocating slide wherein the slide is maintained by the bearing against upward as well as downward movement. In the design shown in Fig. 4 the reciprocating member 50 of the slide is provided with longitudinal ball races 51 in its opposite vertical faces and the slide 50 is supported by bearing balls 52 in longitudinal ball races 53 in the fixed members 54 of the bearing. The ball races of the member 54 are provided on each side with vertical faces 55 adjacent which are the vertical edges of the slide 50. These vertical faces of the movable slide and supporting members are finished to come into engagement under transverse shock or thrust before the bearing balls and their engaging faces are deformed beyond their respective elastic limits.

The bearing shown in Fig. 4 is also protected against overload or shock in a vertical direction. For this purpose the inner faces of the supporting members 54 are projected inwardly toward each other to overlie the adjacent margins of the slide 50. The opposing faces of the slide and the projecting portions of the members 54 are finished to provide plain bearing surfaces which are normally out of contact but are brought into contact by the overload or shock in any direction.

I have illustrated my invention as applied to certain of the more common types of ball- and roller-bearing but it will be understood that my invention is not limited to bearings of these types but may be readily applied to ball- and roller-bearings of other types.

I claim:

1. In an anti-friction bearing, the combination with the bearing races and the interposed anti-friction elements, of a plurality of plain bearings each comprising opposed bearing surfaces of the relatively moving parts with the clearance between the bearing faces less than the compression which the anti-friction bearing parts will withstand without exceeding their elastic limit, said plain bearings having their bearing faces at different angles.

2. In an anti-friction bearing, the combination with the bearing races and the interposed anti-friction elements of a plain bearing consisting of opposed bearing surfaces on the relatively movable members, respectively, said surfaces being normally spaced apart a distance less than the compression which the parts of the anti-friction bearing will withstand without exceeding their elastic limit, and a second plain bearing at right angles to said first mentioned plain bearing with its bearing surfaces similarly spaced from each other.

3. In an anti-friction bearing for relatively rotating parts, the combination of an inner race, an outer race concentric therewith, anti-friction elements in said races, plain bearing surfaces on the circumferential faces of the metal of said races on one side of the said anti-friction elements, said bearing surfaces being spaced from each other a distance less than the compression which the parts of the anti-friction bearing will withstand without permanent deformation and a second plain bearing comprising similarly spaced bearing surfaces on opposed transverse faces of said relatively rotating parts.

4. An anti-friction bearing for supporting a reciprocating member comprising parallel and opposed bearing races in the relatively movable parts, anti-friction members in said races, the metal adjacent said bearing races being finished to provide plain bearing surfaces which are normally out of contact but with a clearance less than the compression which the parts of the anti-friction bearing will withstand without permanent deformation and a second pair of similarly spaced bearing surfaces at right angles to the first-mentioned bearing surfaces on said parts.

JOSEPH J. OSPLACK.